(12) United States Patent
Grubbs

(10) Patent No.: US 6,820,917 B2
(45) Date of Patent: Nov. 23, 2004

(54) VEHICLE CONVERTIBLE ROOF

(75) Inventor: Todd Grubbs, Adrian, MI (US)

(73) Assignee: ASC Incorporated, Southgate, MI (US)

( * ) Notice: Subject to any disclaimer, the term of this patent is extended or adjusted under 35 U.S.C. 154(b) by 45 days.

(21) Appl. No.: 10/246,114

(22) Filed: Sep. 18, 2002

(65) Prior Publication Data

US 2004/0051343 A1 Mar. 18, 2004

(51) Int. Cl.$^7$ .................................................. B60J 7/08
(52) U.S. Cl. .................. 296/107.17; 296/108; 296/117; 296/107.08
(58) Field of Search ...................... 296/107.01, 107.07, 296/107.08, 107.16, 107.17, 108, 121, 117

(56) References Cited

U.S. PATENT DOCUMENTS

| | | |
|---|---|---|
| 404,405 A | 6/1889 | Haughey |
| 1,184,734 A | 5/1916 | Freeman |
| 1,784,279 A | 12/1930 | Ellerbeck |
| 1,988,346 A | 1/1935 | Wagner |
| 2,007,873 A | 7/1935 | Paulin |
| 2,076,243 A | 4/1937 | Marshall et al. |
| 2,303,789 A | 12/1942 | Carr |
| 2,564,446 A | 8/1951 | Parsons |
| 2,580,486 A | 1/1952 | Vigmostad |
| 2,596,355 A | 5/1952 | Ackermans |
| 2,704,225 A | 3/1955 | Anschuetz et al. |
| 2,747,928 A | 5/1956 | Olivier et al. |
| 2,768,024 A | 10/1956 | Spear, Jr. |
| 2,768,025 A | 10/1956 | Spear, Jr. et al. |
| 2,841,441 A | 7/1958 | Evans |
| 2,856,231 A | 10/1958 | Zeman |
| 2,869,923 A | 1/1959 | Mulichak |
| 2,919,156 A | 12/1959 | Dodge |
| 2,939,742 A | 6/1960 | Dardarian et al. |
| 2,997,337 A | 8/1961 | Day et al. |
| 3,059,962 A | 10/1962 | Harms et al. |
| 3,154,341 A | 10/1964 | Booth |
| 3,172,695 A | 3/1965 | Bordinat, Jr. |
| 3,357,738 A | 12/1967 | Bourlier |
| 3,375,037 A | 3/1968 | Hunt, Jr. |
| 3,377,099 A | 4/1968 | Podolan |
| 3,575,464 A | 4/1971 | Himka et al. |
| 3,994,524 A | 11/1976 | Lehmann |
| 4,168,859 A | 9/1979 | Breitschwerdt et al. |
| 4,573,732 A | 3/1986 | Muscat |
| 4,634,171 A | 1/1987 | McKeag |
| 4,711,485 A | 12/1987 | Maebayashi et al. |
| 4,712,828 A | 12/1987 | Albrecht |
| 4,729,592 A | 3/1988 | Tuchiya et al. |
| 4,746,163 A | 5/1988 | Muscat |
| 4,787,675 A | * 11/1988 | McLeod ..................... 297/335 |
| 4,796,943 A | 1/1989 | Fukutomi et al. |

(List continued on next page.)

FOREIGN PATENT DOCUMENTS

| | | |
|---|---|---|
| BE | 493260 | 5/1950 |
| CH | 650980 | 8/1985 |
| DE | 646381 | 5/1937 |

(List continued on next page.)

OTHER PUBLICATIONS

U.S. patent application Ser. No. 60/403,691, Eichhorst et al., filed Aug. 15, 2002.

(List continued on next page.)

Primary Examiner—D. Glenn Dayoan
Assistant Examiner—Patricia L. Engle
(74) Attorney, Agent, or Firm—Harness, Dickey & Pierce, P.L.C.

(57) ABSTRACT

A convertible roof for an automotive vehicle is provided. In one aspect of the present invention, a retraction mechanism couples first, second and third roof sections to a vehicle. Another aspect of the present invention employs a flexible cable interconnecting a rear linkage with a forward pivot assembly to pivot the first roof section relative to the second roof section. Another aspect of the present invention provides that the three roof sections are substantially horizontally oriented in a stowed position.

24 Claims, 10 Drawing Sheets

U.S. PATENT DOCUMENTS

| | | | |
|---|---|---|---|
| 4,852,935 A | 8/1989 | Varner | |
| 4,854,634 A | 8/1989 | Shiraishi et al. | |
| 4,895,409 A | 1/1990 | Konishi et al. | |
| 4,950,022 A | 8/1990 | Pattee | |
| 4,958,882 A | 9/1990 | Kolb | |
| 5,029,932 A | 7/1991 | Parr | |
| 5,033,789 A | 7/1991 | Hayashi et al. | |
| 5,035,461 A | 7/1991 | Zweigart | |
| 5,067,768 A | 11/1991 | Fischbach | |
| 5,078,447 A | 1/1992 | Klein et al. | |
| 5,090,764 A | 2/1992 | Kogawa et al. | |
| 5,161,852 A | 11/1992 | Alexander et al. | |
| 5,195,798 A | 3/1993 | Klein et al. | |
| 5,207,474 A | 5/1993 | Licher et al. | |
| 5,209,544 A | 5/1993 | Benedetto et al. | |
| 5,225,747 A | 7/1993 | Helms et al. | |
| 5,429,409 A | 7/1995 | Corder et al. | |
| 5,451,849 A | 9/1995 | Porter et al. | |
| 5,490,709 A | 2/1996 | Rahn | |
| 5,520,432 A | 5/1996 | Gmeiner et al. | |
| 5,533,777 A | 7/1996 | Kleemann et al. | |
| 5,542,735 A | 8/1996 | Fürst et al. | |
| 5,593,202 A | 1/1997 | Corder et al. | |
| 5,743,587 A | 4/1998 | Alexander et al. | |
| 5,769,483 A | 6/1998 | Danzl et al. | |
| 5,772,274 A | 6/1998 | Tokarz | |
| 5,772,275 A | 6/1998 | Tokarz | |
| 5,785,375 A | 7/1998 | Alexander et al. | |
| 5,806,912 A | 9/1998 | Ramaciotti et al. | |
| D406,792 S | 3/1999 | Alexander et al. | |
| 5,975,620 A | 11/1999 | Jambor et al. | |
| 5,979,970 A | 11/1999 | Rothe et al. | |
| 5,988,729 A | 11/1999 | Klein | |
| 6,007,143 A | 12/1999 | Lehmann et al. | |
| 6,010,178 A | 1/2000 | Hahn et al. | |
| 6,019,416 A | 2/2000 | Beierl | |
| 6,030,023 A | 2/2000 | Guillez | |
| 6,033,008 A | 3/2000 | Mattila | |
| 6,033,009 A | 3/2000 | Ritter et al. | |
| 6,039,382 A | 3/2000 | Mather et al. | |
| 6,039,383 A | 3/2000 | Jambor et al. | |
| 6,053,560 A | 4/2000 | Rothe | |
| D427,138 S | 6/2000 | Alexander et al. | |
| 6,168,224 B1 | 1/2001 | Henn et al. | |
| 6,217,104 B1 | 4/2001 | Neubrand | |
| D442,541 S | 5/2001 | Alexander et al. | |
| 6,273,492 B1 | 8/2001 | Schroder et al. | |
| 6,283,532 B1 | 9/2001 | Neubrand | |
| 6,299,234 B1 | 10/2001 | Seel et al. | |
| 6,305,737 B1 * | 10/2001 | Corder et al. | 296/146.11 |
| 6,312,041 B1 | 11/2001 | Queveau et al. | |
| 6,312,042 B1 | 11/2001 | Halbweiss et al. | |
| 6,315,349 B1 | 11/2001 | Kinnanen | |
| 6,318,793 B1 | 11/2001 | Rapin et al. | |
| 6,325,446 B1 | 12/2001 | Wuellrich et al. | |
| 6,328,372 B1 | 12/2001 | Just | |
| 6,334,644 B1 * | 1/2002 | Gurtler et al. | 296/108 |
| 6,336,673 B1 | 1/2002 | Rothe et al. | |
| 6,347,828 B1 | 2/2002 | Rapin et al. | |
| 6,390,532 B1 | 5/2002 | Mac Farland | |
| 6,422,637 B1 * | 7/2002 | Mac Farland | 296/107.15 |
| 6,502,891 B2 * | 1/2003 | Russke | 296/107.17 |
| 6,505,881 B2 * | 1/2003 | Kinnanen | 296/107.17 |
| 6,572,175 B2 * | 6/2003 | Schütt et al. | 296/108 |
| 6,592,169 B2 * | 7/2003 | Obendiek | 296/107.07 |
| 6,604,775 B2 * | 8/2003 | Obendiek | 296/108 |
| 2001/0006297 A1 | 7/2001 | Dintner et al. | |
| 2001/0019213 A1 | 9/2001 | Eberle | |
| 2001/0020793 A1 | 9/2001 | Eberle | |
| 2002/0125733 A1 * | 9/2002 | Kinnanen | 296/107.17 |
| 2002/0185886 A1 | 12/2002 | Obendiek | |
| 2003/0080579 A1 * | 5/2003 | Reinsch | 296/107.17 |
| 2003/0085587 A1 * | 5/2003 | Reinsch | 296/107.17 |

FOREIGN PATENT DOCUMENTS

| | | |
|---|---|---|
| DE | 1 505 474 | 7/1969 |
| DE | 3416286 A1 | 10/1984 |
| DE | 3635373 A1 | 4/1988 |
| DE | 3635887 A1 | 5/1988 |
| DE | 3733892 A | 4/1989 |
| DE | 3816060 A | 11/1989 |
| DE | 9108242 | 12/1992 |
| DE | 4316485 A1 | 11/1994 |
| DE | 4320603 A1 | 1/1995 |
| DE | 4324708 A1 | 1/1995 |
| DE | 4438191 C1 | 7/1995 |
| DE | 4438190 C1 | 11/1995 |
| DE | 4431656 C1 | 12/1995 |
| DE | 4445580 C1 | 12/1995 |
| DE | 4445941 C1 | 3/1996 |
| DE | 4445944 C1 | 4/1996 |
| DE | 4446483 A1 | 6/1996 |
| DE | 19517063 C1 | 6/1996 |
| DE | 4445920 A1 | 7/1996 |
| DE | 19514022 C1 | 9/1996 |
| DE | 19518071 A1 | 11/1996 |
| DE | 19532568 C1 | 11/1996 |
| DE | 19532567 C1 | 12/1996 |
| EP | 0261379 A2 | 4/1987 |
| EP | 0494366 A2 | 7/1992 |
| FR | 1049026 | 12/1953 |
| FR | 2 818 931 | 7/2002 |
| GB | 413467 | 7/1934 |
| GB | 756531 | 9/1956 |
| GB | 978638 | 12/1964 |
| JP | 62-120222 | 6/1987 |
| JP | 2-51925 | 4/1990 |
| JP | 2-144226 | 4/1990 |

OTHER PUBLICATIONS

U.S. patent application Ser. No. 10/245,973, Willard, filed Sep. 18, 2002.

Picture of a 1957 Ford Fairlane retractable hardtop convertible, The Detroit New, Apr. 6, 1994.

Viper Pure Perforance By Dodge/Auto Editors of Consumder Guide, Publications International, Ltd. pp. 6 and 7, 1993.

Automotive Industries, Feb. 1990, p. 75, showing "C & C Intrigue".

Automobil Revue, Sep. 5, 1991, cover page and p. 29 (including English translation).

Car Styling 86, Jan. 1992, cover page and pp. 64–67 (including English translation).

Introducing the Chevy SSR, Aug. 2000, 2 pages (and description of corresponding public use).

Alfa Romeo Proteo Or Alfa Romeo 164 Proteo / 1991 (believed to have been offered for sale, publicly used, and/or published prior to the filing date of this application).

Alfa Romeo Spider Rht / 2001 (believed to have been offered for sale, publicly used, and/or published prior to the filing date of this application).

Audi Quattro Roadster / 1984–1987 (believed to have been offered for sale, publicly used, and/or published prior to the filing date of this application).

Bently Retractable Hardtop / 1999 (believed to have been offered for sale, publicly used, and/or published prior to the filing date of this application).

Bérard Roadster / 2001 (believed to have been offered for sale, publicly used, and/or published prior to the filing date of this application).
BMW Klapp Top / 2000 (believed to have been offered for sale, publicly used, and/or published prior to the filing date of this application).
BMW Oasys Vision / 2002 (believed to have been offered for sale, publicly used, and/or published prior to the filing date of this application).
Buick Blackhawk / 2000 (believed to have been offered for sale, publicly used, and/or published prior to the filing date of this application).
Cadillac Allanté Charisma / 1994 (believed to have been offered for sale, publicly used, and/or published prior to the filing date of this application).
Cadillac Evoq / 1999 (believed to have been offered for sale, publicly used, and/or published prior to the filing date of this application).
Cadillac XLR / 2003–200x (believed to have been offered for sale, publicly used, and/or published prior to the filing date of this application).
C&C Intrigue / 1990 (believed to have been offered for sale, publicly used, and/or published prior to the filing date of this application).
Chevrolet SSR / 2000 (believed to have been offered for sale, publicly used, and/or published prior to the filing date of this application).
Chevrolet SSR / 2001–200x (believed to have been offered for sale, publicly used, and/or published prior to the filing date of this application).
Chevrolet Corvette Retractable Hardtop / 1958 (believed to have been offered for sale, publicly used, and/or published prior to the filing date of this application).
Chrysler Thunderbolt / 1941 (believed to have been offered for sale, publicly used, and/or published prior to the filing date of this application).
Chrysler Dart / 1957 (believed to have been offered for sale, publicly used, and/or published prior to the filing date of this application).
Chrysler Phaeton / 1997 (believed to have been offered for sale, publicly used, and/or published prior to the filing date of this application).
Citroën 15 Six / 1950 (believed to have been offered for sale, publicly used, and/or published prior to the filing date of this application).
Citroën 11 Légère / 1952 (believed to have been offered for sale, publicly used, and/or published prior to the filing date of this application).
Daihatsu Kopen / 1999 (believed to have been offered for sale, publicly used, and/or published prior to the filing date of this application).
Daihatsu Kopen / 2001 (believed to have been offered for sale, publicly used, and/or published prior to the filing date of this application).
Edsel Retractable Hardtop / 1958 (believed to have been offered for sale, publicly used, and/or published prior to the filing date of this application).
Edsel Skyliner / 1958 (believed to have been offered for sale, publicly used, and/or published prior to the filing date of this application).
Ferrari Testarossa St. Tropez / 1992 (believed to have been offered for sale, publicly used, and/or published prior to the filing date of this application).
Fiat Punto Wish / 1999 (believed to have been offered for sale, publicly used, and/or published prior to the filing date of this application).
Ford Fairlane 500 Skyliner / 1957 (believed to have been offered for sale, publicly used, and/or published prior to the filing date of this application).
Ford Fairlane 500 Skyliner / 1958 (believed to have been offered for sale, publicly used, and/or published prior to the filing date of this application).
Ford Galaxie Skyliner / 1959 (believed to have been offered for sale, publicly used, and/or published prior to the filing date of this application).
Ford Mustang Restro–mod / 1964 (believed to have been offered for sale, publicly used, and/or published prior to the filing date of this application).
Ford Mustang Retractable Hardtop / 1964 (believed to have been offered for sale, publicly used, and/or published prior to the filing date of this application).
Ford Mustang Retractable Hardtop / 1966 (believed to have been offered for sale, publicly used, and/or published prior to the filing date of this application).
Ford Focus Cabriolet Retractable Hardtop / 1999 (believed to have been offered for sale, publicly used, and/or published prior to the filing date of this application).
Gaylord Gladioator / 1955–1956 (believed to have been offered for sale, publicly used, and/or published prior to the filing date of this application).
Heuliez Raffica / 1992 (believed to have been offered for sale, publicly used, and/or published prior to the filing date of this application).
Heuliez Hardtop Intruder / 1998 (believed to have been offered for sale, publicly used, and/or published prior to the filing date of this application).
pg,14
Heuliez Retractop 2 / 2000 (believed to have been offered for sale, publicly used, and/or published prior to the filing date of this application).
Heuliez Retractop 10 / 2001 (believed to have been offered for sale, publicly used, and/or published prior to the filing date of this application).
Honda Argento Vivo / 1995 (believed to have been offered for sale, publicly used, and/or published prior to the filing date of this application).
Hudson Super Six / 1922 (believed to have been offered for sale, publicly used, and/or published prior to the filing date of this application).
Hudson Super Six / 1923 (believed to have been offered for sale, publicly used, and/or published prior to the filing date of this application).
Isuzu VS–02 / 1999 (believed to have been offered for sale, publicly used, and/or published prior to the filing date of this application).
Karmann Coupé–Cabrio / 1999 (believed to have been offered for sale, publicly used, and/or published prior to the filing date of this application).
Keinath GT/R 1996–200x (believed to have been offered for sale, publicly used, and/or published prior to the filing date of this application).
Lada Roadster / 2000 (believed to have been offered for sale, publicly used, and/or published prior to the filing date of this application).
Lancia Belna Éclipse / 1934 (believed to have been offered for sale, publicly used, and/or published prior to the filing date of this application).

Lexus Sport Coupé / 1999 (believed to have been offered for sale, publicly used, and/or published prior to the filing date of this application).
Lexus SC430 / 2000–200x (believed to have been offered for sale, publicly used, and/or published prior to the filing date of this application).
Mercedes–Benz Magic Top / 1984–1987 (believed to have been offered for sale, publicly used, and/or published prior to the filing date of this application).
Mercedes–Benz SLK Paris / 1994 (believed to have been offered for sale, publicly used, and/or published prior to the filing date of this application).
Heuliez Retractop Feb. 2000 (believed to have been offered for sale, publicly used, and/or published prior to the filing date of this application).
Heuliez Retractop Oct. 2001 (believed to have been offered for sale, publicly used, and/or published prior to the filing date of this application).
Honda Argento Vivo / 1995 (believed to have been offered for sale, publicly used, and/or published prior to the filing date of this application).
Hudson Super Six / 1922 (believed to have been offered for sale, publicly used, and/or published prior to the filing date of this application).
Hudson Super Six / 1923 (believed to have been offered for sale, publicly used, and/or published prior to the filing date of this application).
Isuzu VX–02 / 1999 (believed to have been offered for sale, publicly used, and/or published prior to the filing date of this application).
Karmann Coupé–Cabrio / 1999 (believed to have been offered for sale, publicly used, and/or published prior to the filing date of this application).
Keinath GT/R / 1996–200x (believed to have been offered for sale, publicly used, and/or published prior to the filing date of this application).
Lada Roadster / 2000 (believed to have been offered for sale, publicly used, and/or published prior to the filing date of this application).
Lancia Belna Éclipse / 1934 (believed to have been offered for sale, publicly used, and/or published prior to the filing date of this application).
Lexus Sport Coupé / 1999 (believed to have been offered for sale, publicly used, and/or published prior to the filing date of this application).
Lexus SC430 / 2000–200x (believed to have been offered for sale, publicly used, and/or published prior to the filing date of this application).
Mercedes–Benz Magic Top / 1984–1987 (believed to have been offered for sale, publicly used, and/or published prior to the filing date of this application).
Mercedes–Benz SLK Paris / 1994 (believed to have been offered for sale, publicly used, and/or published prior to the filing date of this application).
Mercedes–Benz SLK/ 1996–200x (believed to have been offered for sale, publicly used, and/or published prior to the filing date of this application).
Mercedes–Benz GLK / 1999 (believed to have been offered for sale, publicly used, and/or published prior to the filing date of this application).
Mercedes–Benz SL / 2001–200x (believed to have been offered for sale, publicly used, and/or published prior to the filing date of this application).
Michalak Corsaspider / 1984–1988 (believed to have been offered for sale, publicly used, and/or published prior to the filing date of this application).
Mitsubishi Colt Aiolia / 1988 (believed to have been offered for sale, publicly used, and/or published prior to the filing date of this application).
Mitsubishi 3000 GT Spyder / 1994–1996 (believed to have been offered for sale, publicly used, and/or published prior to the filing date of this application).
Mohs Safarikar / 1972–1975 (believed to have been offered for sale, publicly used, and/or published prior to the filing date of this application).
Nisan Luc–2 / 1985 (believed to have been offered for sale, publicly used, and/or published prior to the filing date of this application).
Nissan 300 ZX / 1992 (belieed to have been offered for sale, publicly used, and/or published prior to the filing date of this application).
Nissan Silvia Varietta / 1999 (believed to have been offered for sale, publicly used, and/or published prior to the filing date of this application).
Oldsmobile F–88 MK3 / 1959 (believed to have been offered for sale, publicly used, and/or published prior to the filing date of this application).
Paxton / 1951 (believed to have been offered for sale, publicly used, and/or published prior to the filing date of this application).
Peugeot 301 Éclipse / 1934 (believed to have been offered for sale, publicly used, and/or published prior to the filing date of this application).
Peugeot 601c Éclipse / 1934 (believed to have been offered for sale, publicly used, and/or published prior to the filing date of this application).
Peugeot 601dl Éclipse / 1934 (believed to have been offered for sale, publicly used, and/or published prior to the filing date of this application).
Peugeot 401d Éclipse / 1934–1935 (believed to have been offered for sale, publicly used, and/or published prior to the filing date of this application).
Peugeot 601d Éclipse / 1934–1935 (believed to have been offered for sale, publicly used, and/or published prior to the filing date of this application).
Peugeot 402 Éclipse Électrique / 1935–1936 (believed to have been offered for sale, publicly used, and/or published prior to the filing date of this application).
Peugeot 402 Éclipse Mécanique / 1936–1938 (believed to have been offered for sale, publicly used, and/or published prior to the filing date of this application).
Peugeot 202 Éclipse / 1938 (believed to have been offered for sale, publicly used, and/or published prior to the filing date of this application).
Peugeot 402b Éclipse Mécanique / 1938–1939 (believed to have been offered for sale, publicly used, and/or published prior to the filing date of this application).
Peugeot 106 Spider / 1992 (believed to have been offered for sale, publicly used, and/or published prior to the filing date of this application).
Peugeot ▨/ 1998 (believed to have been offered for sale, publicly used, and/or published prior to the filing date of this application).
Peugeot Crisalys / 1998 (believed to have been offered for sale, publicly used, and/or published prior to the filing date of this application).

Peugeot 607 Paladine / 2000 (believed to have been offered for sale, publicly used, and/or published prior to the filing date of this application).

Peugeot 206 CC / 2000–200x (believed to have been offered for sale, publicly used, and/or published prior to the filing date of this application).

Peugeot 206 CC Ciel Bleu / 2001 (believed to have been offered for sale, publicly used, and/or published prior to the filing date of this application).

Peugeot 7 CC / 2002 (believed to have been offered for sale, publicly used, and/or published prior to the filing date of this application).

Playboy / 1947–1951 (believed to have been offered for sale, publicly used, and/or published prior to the filing date of this application).

Scimitar Hard–Top Convertible / 1959 (believed to have been offered for sale, publicly used, and/or published prior to the filing date of this application).

Skyline X–50 / 1953 (believed to have been offered for sale, publicly used, and/or published prior to the filing date of this application).

Suzuki C2 / 1997 (believed to have been offered for sale, publicly used, and/or published prior to the filing date of this application).

Toyota MRJ / 1995 (believed to have been offered for sale, publicly used, and/or published prior to the filing date of this application).

Toyota Soarer / 2000–200x (believed to have been offered for sale, publicly used, and/or published prior to the filing date of this application).

Treser T1 / 1987–198x (believed to have been offered for sale, publicly used, and/or published prior to the filing date of this application).

Valmet Boreal / 1997 (believed to have been offered for sale, publicly used, and/or published prior to the filing date of this application).

Volvo C70 Hatric / 2001 (believed to have been offered for sale, publicly used, and/or published prior to the filing date of this application).

Volvo C70 Coupé Convertible / 2002 (believed to have been offered for sale, publicly used, and/or published prior to the filing date of this application).

Volvo Lowrider / 19xx (believed to have been offered for sale, publicly used, and/or published prior to the filing date of this application).

* cited by examiner

VEHICLE CONVERTIBLE ROOF

BACKGROUND AND SUMMARY OF THE INVENTION

This invention relates generally to convertible roof structures for automotive vehicles and, more particularly, to a multi-part hard top convertible roof.

Retractable roofs for convertible automotive vehicles presently exist. For example, one retractable hard top roof employs a plurality of rigid roof panels which slide rearwardly over one another during retraction. Typically, these retracting roof panels are mechanically stowed in the trunk of the automotive vehicle. Unfortunately, this system does not fully retract flush within the vehicle body and occupies a relatively large storage space within the trunk.

Recently, various retractable roof systems have been developed with a rigid roof member which swings into a passenger compartment of the vehicle. These systems stow the retracted roof panels in a substantially vertical orientation behind either the front or rear seats. While these systems maintain storage space within the trunk, the retracted roof panels are often stored in an unsightly manner. Additionally, the vertical orientation of the retracted roof panels requires a relatively deep storage compartment. This orientation often precludes use of a retractable roof in vehicles having a usable cargo area such as sport utility vehicles and pick-up trucks. Therefore, it would be desirable to have a retractable hard top roof requiring a minimal packaging envelope to maximize storage space within the trunk or cargo area. To achieve this goal, multiple panels are stored in a substantially horizontal manner to minimize the depth of the required storage area.

In accordance with the present invention, a hard top roof system includes at least three separate and generally rigid sections interconnected to one another to selectively cover the passenger compartment of a vehicle. In another aspect of the present invention, as the roof system is retracted, a middle roof section slides into a nested position with a rear roof section such that the outer surface of the middle roof section is positioned adjacent to the inner surface of the rear roof section. In a further aspect of the present invention, when the roof system is fully retracted, the front roof section is positioned substantially parallel to the ground such that the inner surfaces of the forward and middle roof section face one another. An additional aspect of the present invention provides a convertible roof including a flexible member interconnecting a rear linkage and a forward pivot assembly such that the flexible member selectively forces a first roof section to overcome a biasing force and rotate relative to a second roof section.

The present invention is advantageous over traditional designs in that the roof panels are stacked in a horizontal manner which minimizes the packaging space required in both the fore-and-aft direction and the vertical direction. Furthermore, the present invention is advantageous because the roof sections may be retracted and stowed within the vehicle's trunk so as to maintain the space within the vehicle passenger compartment. The convertible roof of the present invention may also be stowed in a roof storage compartment separated from the passenger compartment and a miscellaneous storage area or trunk.

The present invention also provides a self-covering feature in that when the convertible roof is in the stowed position, the uppermost stacked panel is oriented to display the outer finished surface of the panel. Additionally, the present invention is advantageous because the retracting mechanism is compact and lightweight. To accomplish this feature, the present invention includes a flexible member coupled to a first panel hingedly coupled to a second panel. Additional advantages and features of the present invention will become apparent from the following description and appended claims taken in conjunction with the accompanying drawings.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

Figure 1:
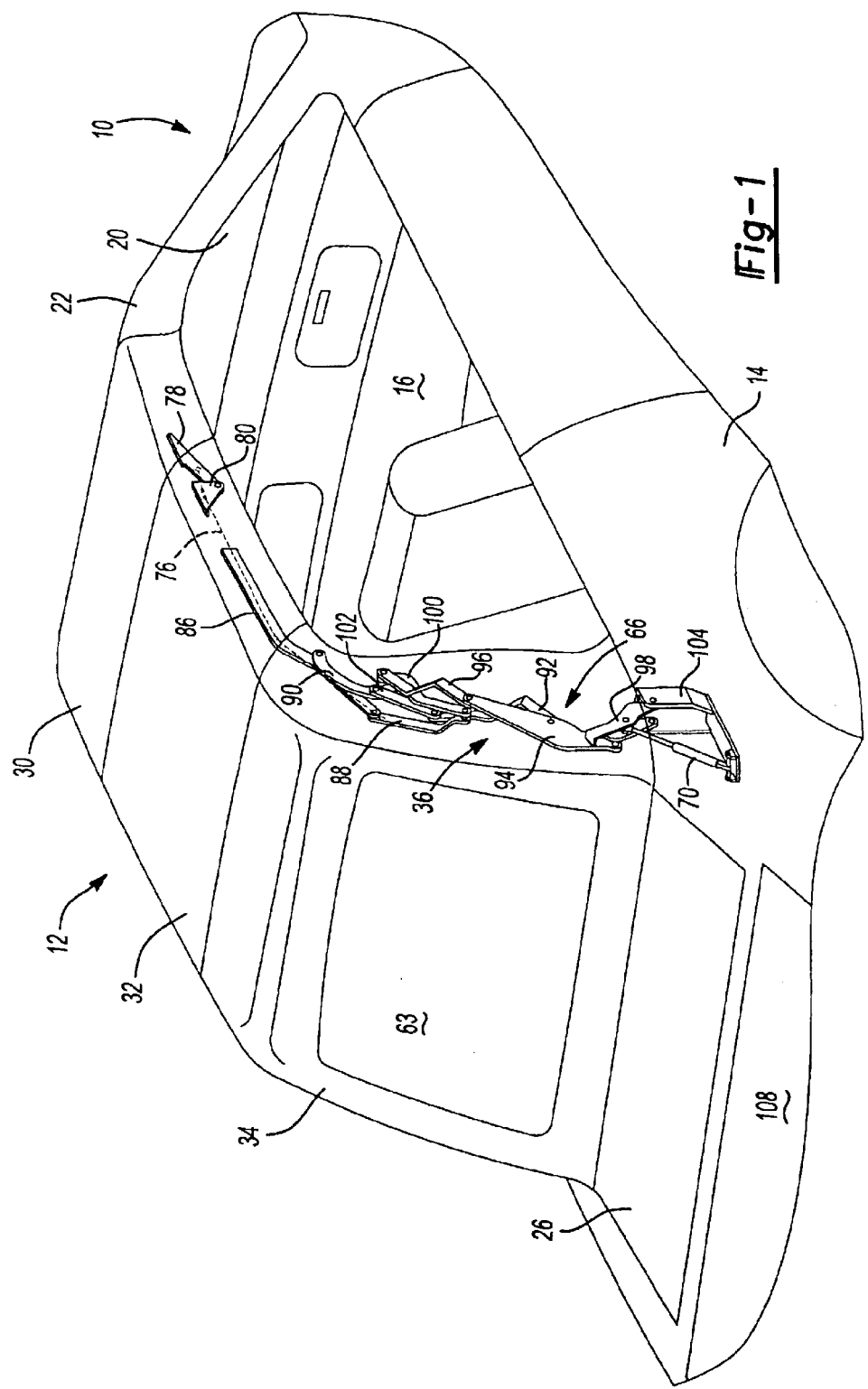
FIG. 1 is a partial perspective view of a convertible roof of the present invention in a raised position.
Figure 2:
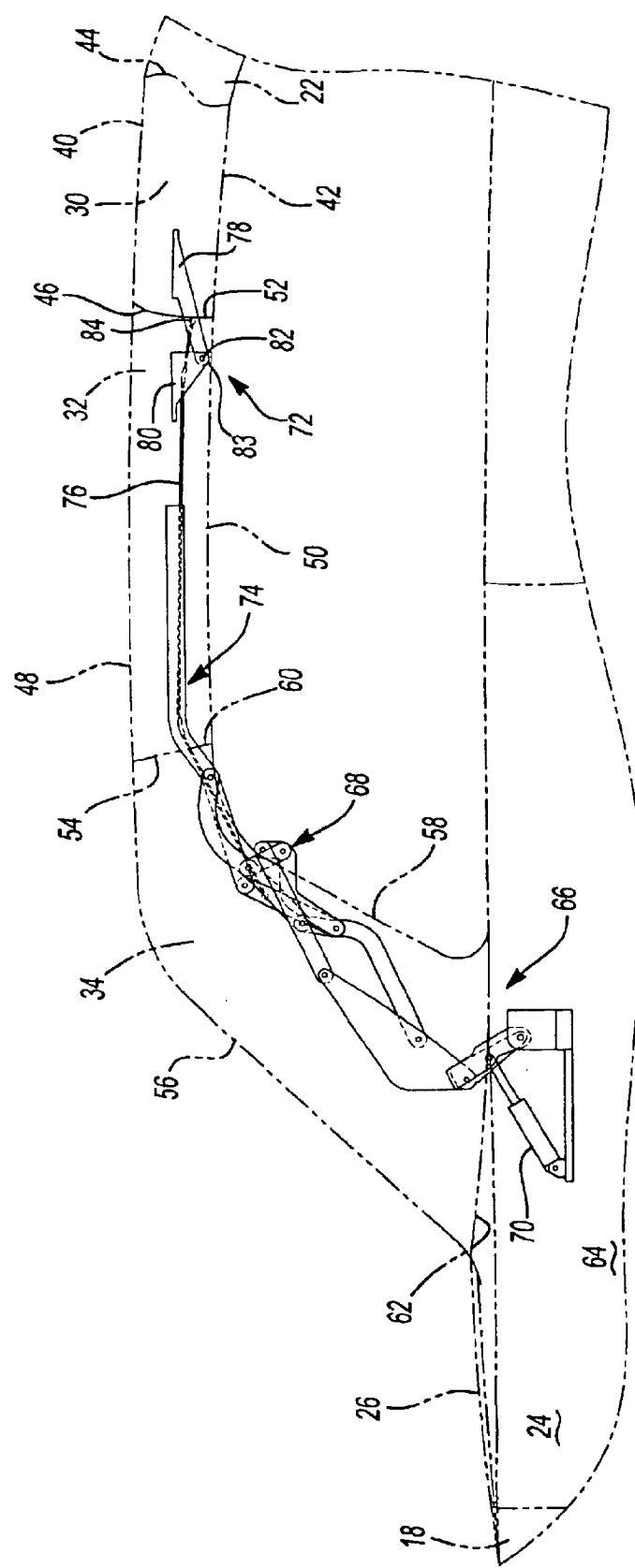
FIG. 2 is a side elevational view of the convertible roof of the present invention in the raised position.
Figure 3:
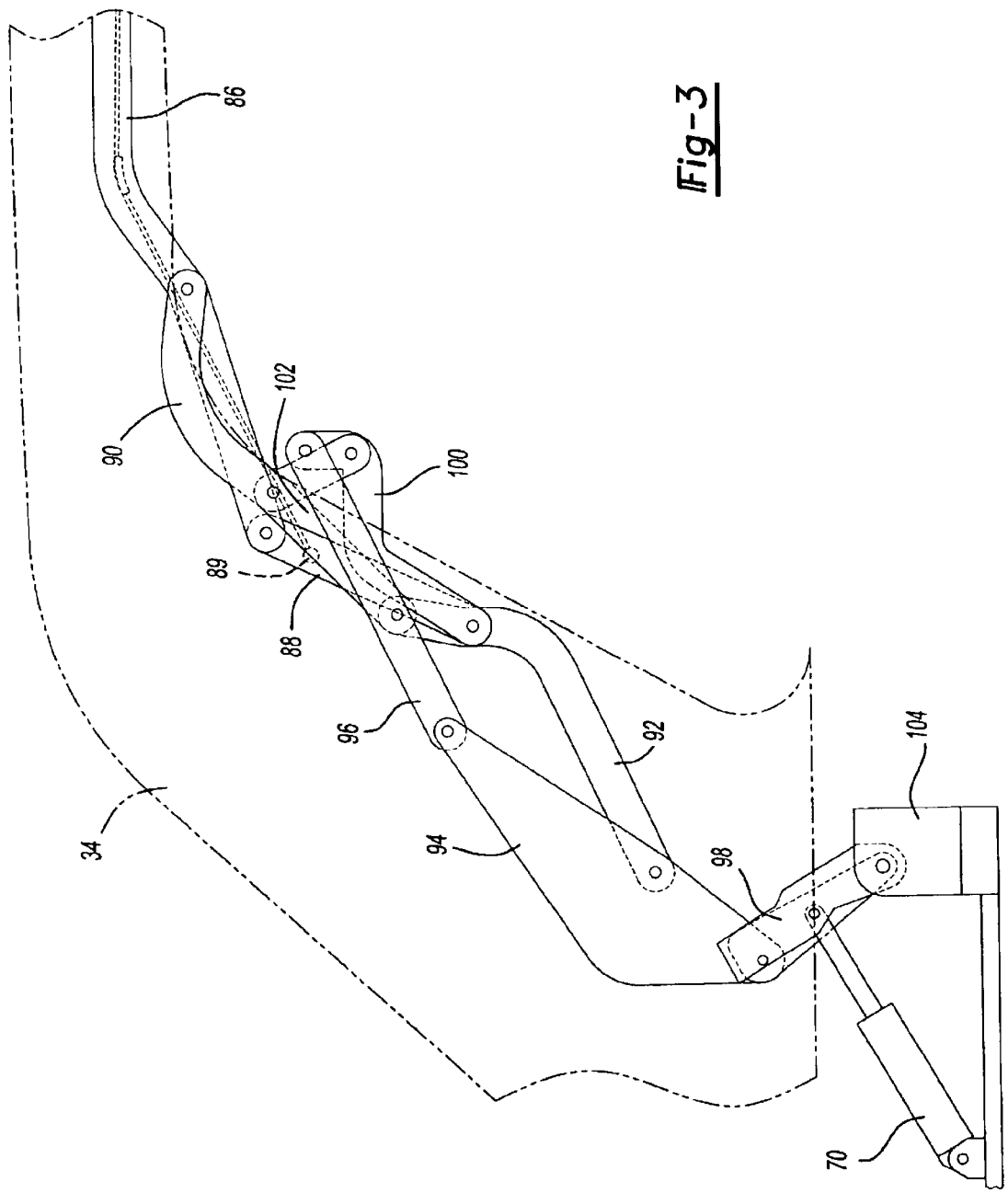
FIG. 3 is a partial enlarged side elevational view of a portion of the convertible roof of the present invention.
Figure 4:
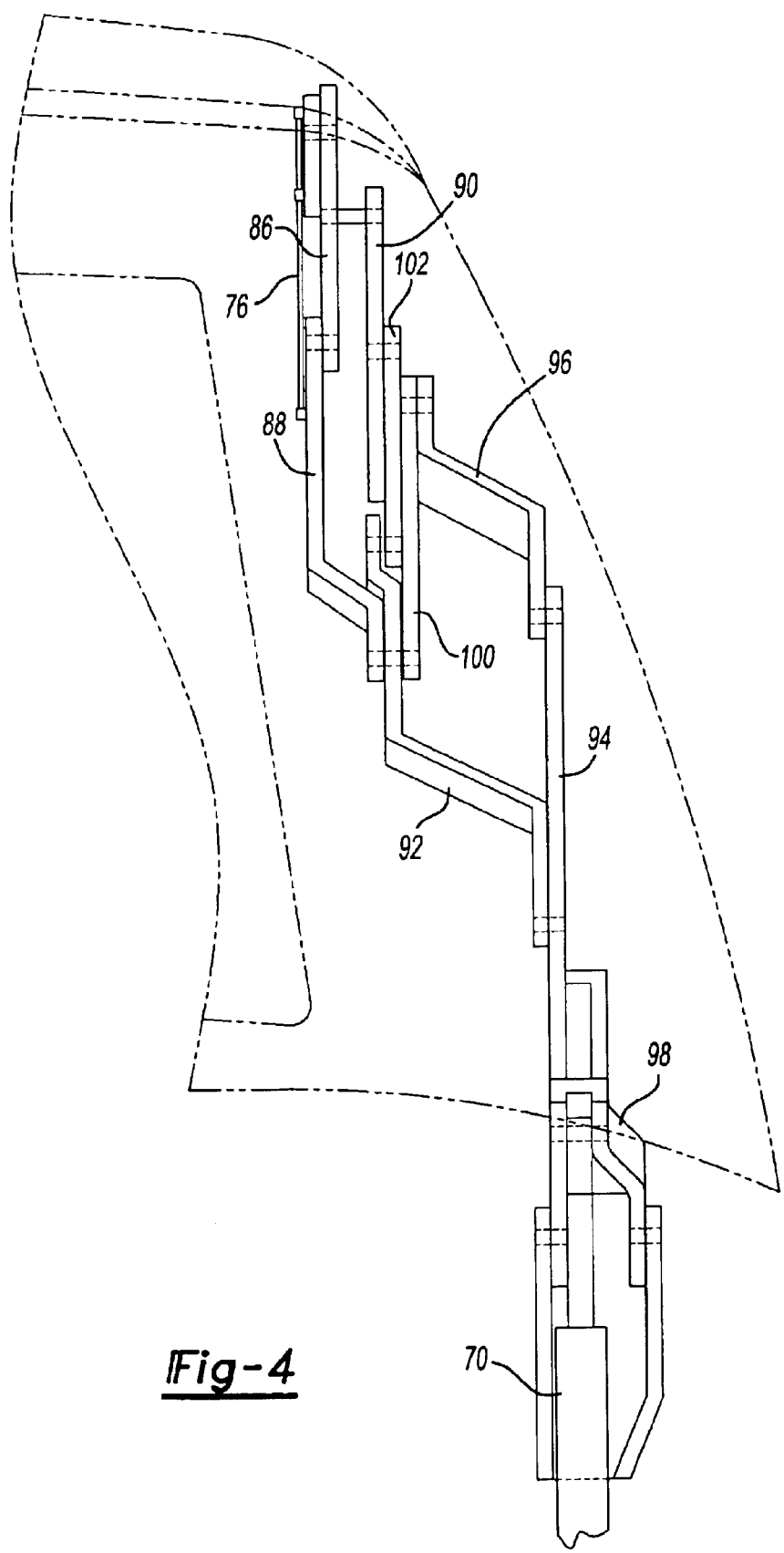
FIG. 4 is a rear elevational view of a portion of the convertible roof of the present invention.
Figure 5:
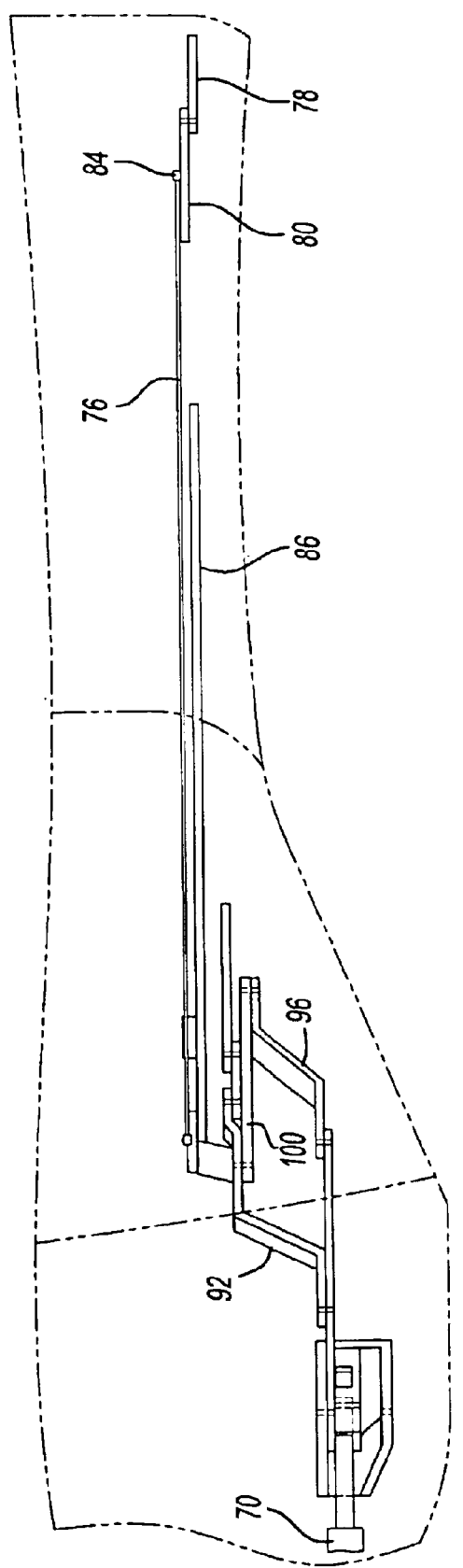
FIG. 5 is a plan view of a portion of the convertible roof of the present invention.

The present invention is described for illustration purposes embodied in a hydro-mechanically actuated three-piece convertible roof for an automotive vehicle. It will be appreciated, however, that the principles of the present invention are readily adaptable to a number of other devices which can retract or deploy a multi-section roof top in a vehicle including a soft top, or flexible fabric covered roof where the actuator or retraction mechanisms are coupled to side rails, or any combined hard and soft top roof.

With reference to FIGS. 1–5, an exemplary automotive vehicle 10 includes a convertible roof 12 constructed in accordance with the teachings of the present invention. Vehicle 10 is constructed with a body 14 having a passenger compartment 16 and a miscellaneous storage area or cargo bed 18. Passenger compartment 16 includes a windshield 20 and a header 22. Header 22 spans transversely across the top of windshield 20. A roof storage compartment or area 24 is located between passenger compartment 16 and miscellaneous storage area 18. A tonneau cover 26 is pivotally coupled to body 14 to selectively enclose roof storage compartment 24.

Convertible roof 12 includes a first roof section 30, a second roof section 32, a third roof section 34 and a retraction mechanism 36. Convertible roof 12 is movable from a raised position depicted in FIGS. 1–5 through intermediate positions such as the position depicted in FIGS. 6–8 to a stowed position depicted in FIGS. 9 and 10. Each of the first, second and third roof sections are substantially rigid members interconnected to one another by retraction mechanism 36.

First roof section 30 is preferably a substantially rigid panel having an outer surface 40, an inner surface 42, a leading edge 44 and a trailing edge 46. First roof section 30 includes a conventional latching mechanism (not shown) which is disengageably attachable with header 22 when convertible roof 12 is in the raised position. Leading edge 44 sealingly engages header 22 when the latching mechanism secures first roof section 30 to windshield 20.

Second roof section 32 includes an outer surface 48, an inner surface 50, a leading edge 52 and a trailing edge 54. Leading edge 52 sealingly engages trailing edge 46 of first roof section 30 when convertible roof 12 is in the raised position.

Third roof section 34 includes an outer surface 56, an inner surface 58, a leading edge 60 and a trailing edge 62. Leading edge 60 is sealingly engaged with trailing edge 54 of second roof section 32 when convertible roof 12 is in the raised position. Trailing edge 62 includes lip seals (not shown) which sealingly engage tonneau cover 26 when third roof section 34 is in the raised position. Third roof section 34 also includes a transparent window 63. Preferably, window 63 is a three-dimensionally curved glass member matching the contour of the rear portion of third roof section 34. Alternatively, window 63 may be a flexible translucent panel constructed from PVC or other suitable material.

Retraction mechanism 36 is mounted in a cavity 64 of roof storage compartment 24. Retraction mechanism 36 includes a pair of actuation assemblies 66 mounted near each outboard edge of vehicle 10. Because each of actuation assemblies 66 are substantially identical mirror images of one another, only the passenger side actuation assembly will be depicted and described in greater detail.

Actuation assembly 66 includes a linkage assembly 68 coupled to an actuator 70. Actuator 70 is presently depicted as a hydraulic cylinder coupled to linkage assembly 68. It should be appreciated that actuator 70 may alternately be constructed as an electric motor, a pneumatic cylinder, or any suitable power source for driving linkage assembly 68. Actuator 70 is coupled to vehicle 10 and positioned within cavity 64 of roof storage compartment 24.

Linkage assembly 68 includes a pivot assembly 72 and a rear linkage 74 interconnected by a flexible member 76. Flexible member 76 is preferably constructed in the form of a stainless steel cable. However, one skilled in the art will appreciate that flexible member 76 may be shaped as a chain, belt or any other suitable tensile member.

Pivot assembly 72 includes a first bracket 78 rotatably coupled to a second bracket 80 via a pin 82. First bracket 78 is coupled to first roof section 30. Second bracket 80 is coupled to second roof section 32. A spring 83 or other resilient member urges first roof section 30 toward the raised position. A first end 84 of flexible member 76 is coupled to first bracket 78.

Rear linkage 74 includes a first link 86, a second link 88, a third link 90, a fourth link 92, a fifth link 94, a sixth link 96, a seventh link 98, an eighth link 100 and a ninth link 102. First link 86 has one end coupled to second roof section 32 and another end coupled to second link 88. A second end 89 of flexible member 76 is coupled to second link 88. One end of third link 90 is pivotally interconnected to a mid-portion of first link 86. The opposite end of third link 90 is pivotally coupled to a mid-portion of eighth link 100. A mid-portion of link 90 is pivotally coupled to an end of fourth link 92 by ninth link 102. The opposite end of fourth link 92 is pivotally coupled to a mid-portion of fifth link 94. One end of fifth link 94 is pivotally coupled to one end of sixth link 96. The opposite end of fifth link 94 is pivotally coupled to one end of seventh link 98. The opposite end of sixth link 96 is pivotally coupled to one end of eighth link 100. The opposite end of eighth link 100 is pivotally coupled to a mid-portion of fourth link 92. The opposite end of seventh link 98 is pivotally coupled to a bracket 104 mounted to vehicle 10. Actuator 70 is pivotally coupled to bracket 104 and a mid-portion of seventh link 98. The attachment location of actuator 70 is merely exemplary and it should be appreciated that any number of locations on the various links may be chosen to drive convertible roof 12 between the stowed position and the raised position.

Tonneau cover 26 is pivotally coupled to body 14 at a hinge 106. Tonneau cover 26 is preferably operated by a separate control system capable of moving tonneau cover 26 from a closed position depicted in FIG. 2 to an open position depicted in FIG. 6. The control system functions to coordinate the movement of tonneau cover 26 with convertible roof 12 such that roof storage compartment 24 is accessible when moving convertible roof 12 between the raised and stowed positions. Alternately, tonneau cover 26 may be manually operated to selectively latch to body 14. As such, roof storage compartment 24 is selectively enclosed or accessible. The manually operated tonneau cover 26 includes a biasing mechanism (not shown) for urging tonneau cover 26 toward the opened position depicted in FIG. 6.

Figure 6:
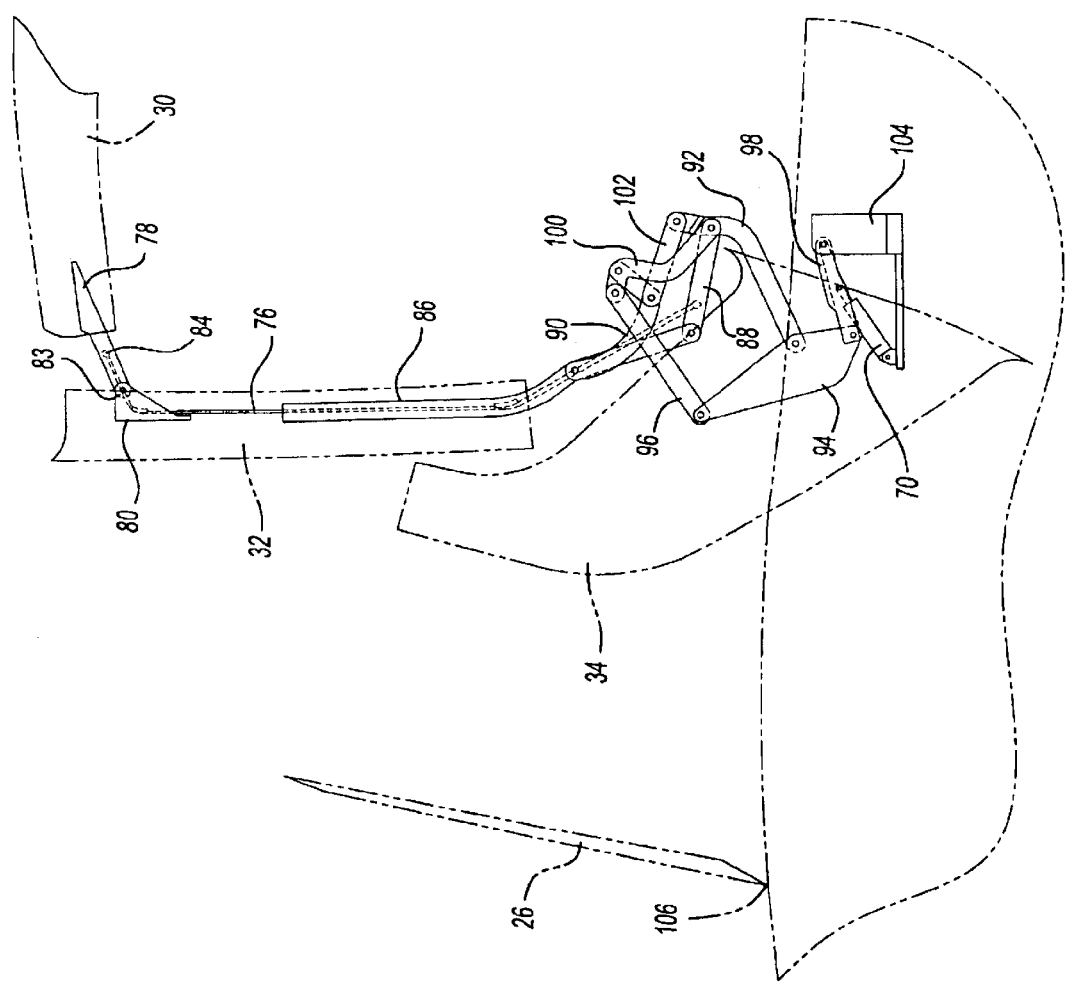
FIG. 6 is a partial side elevational view depicting the convertible roof of the present invention in an intermediate position.
Figure 7:
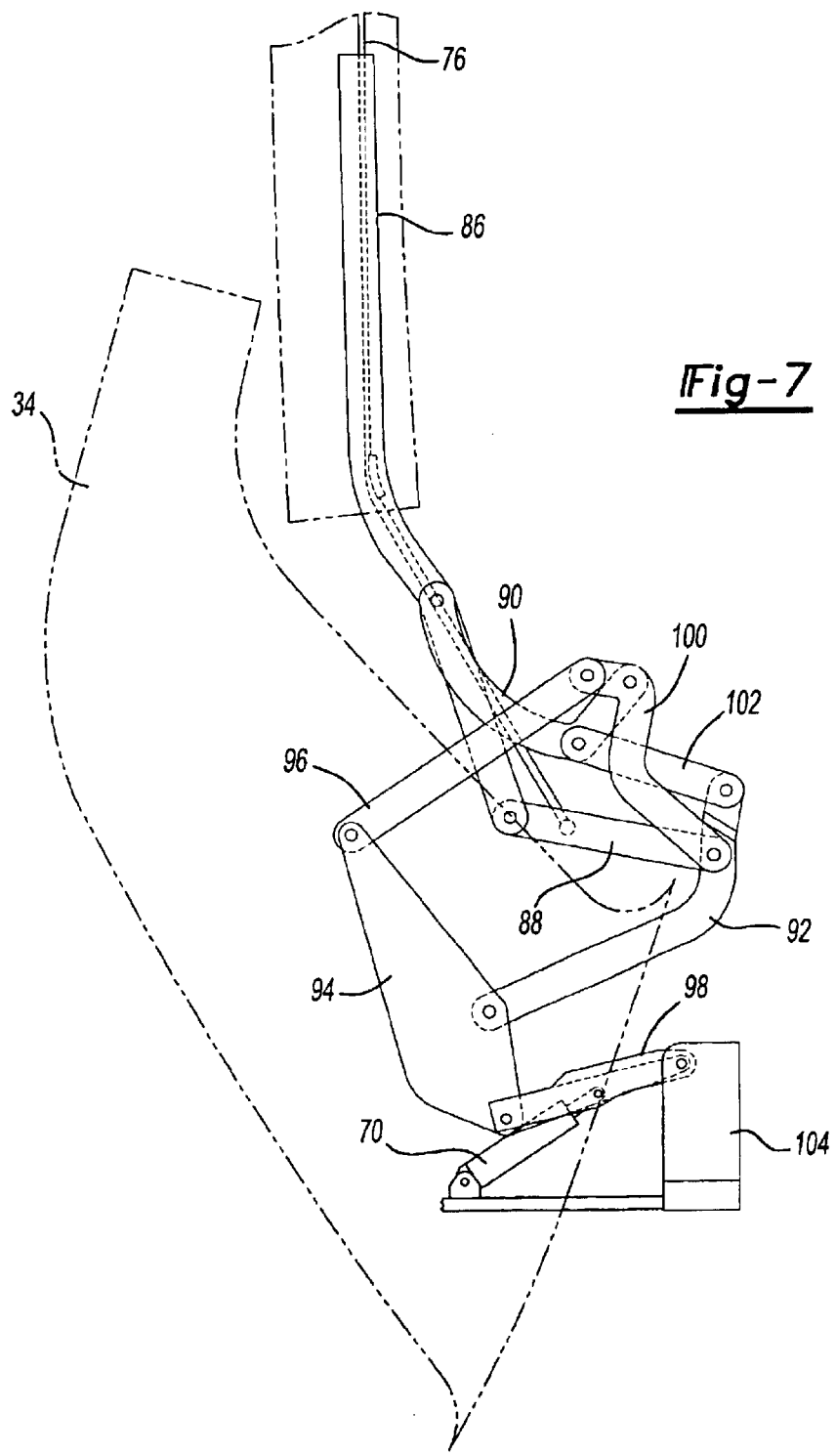
FIG. 7 is a partial enlarged side elevational view of the convertible roof of the present invention in the intermediate position of FIG. 6.
Figure 8:
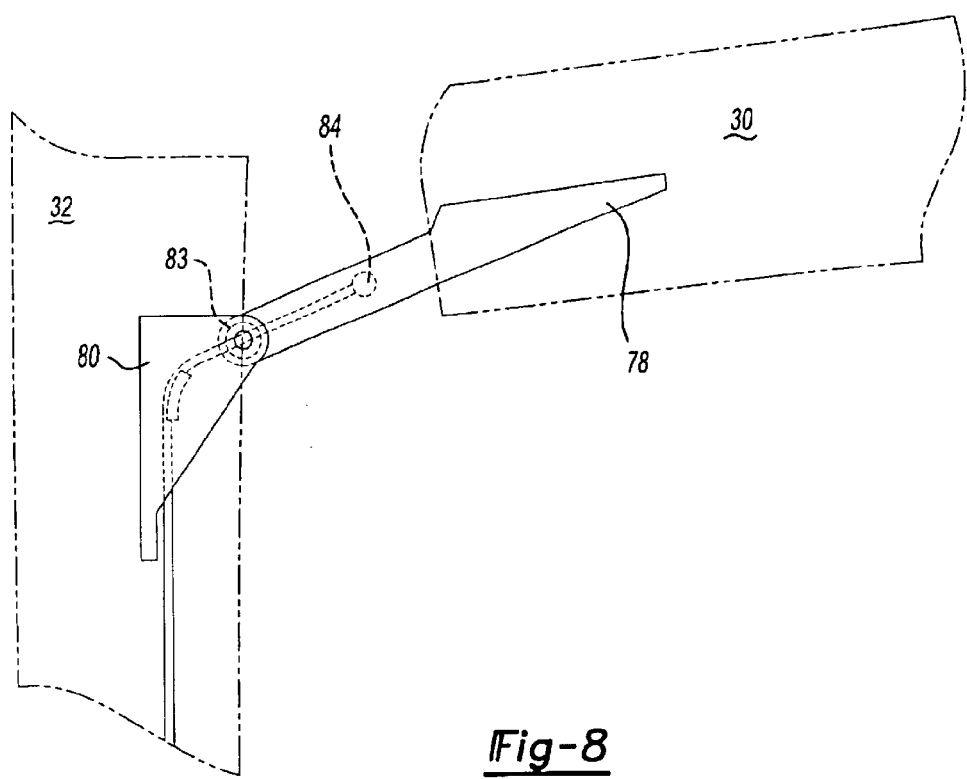
FIG. 8 is a partial enlarged side elevational view of the convertible roof of the present invention in the intermediate position of FIG. 6.
Figure 9:
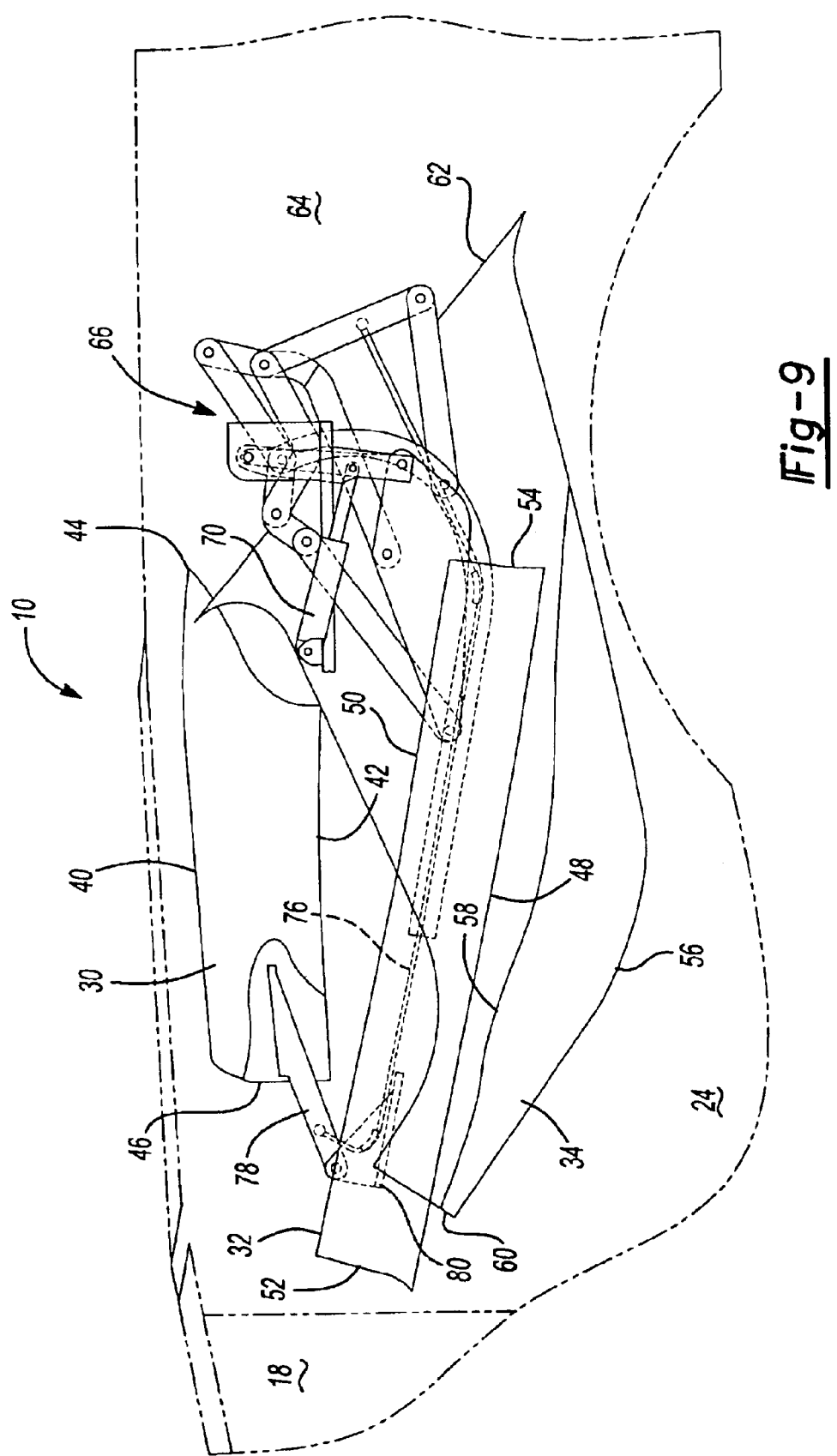
FIG. 9 is a partial side elevational view depicting the convertible roof of the present invention in a stowed position.
Figure 10:
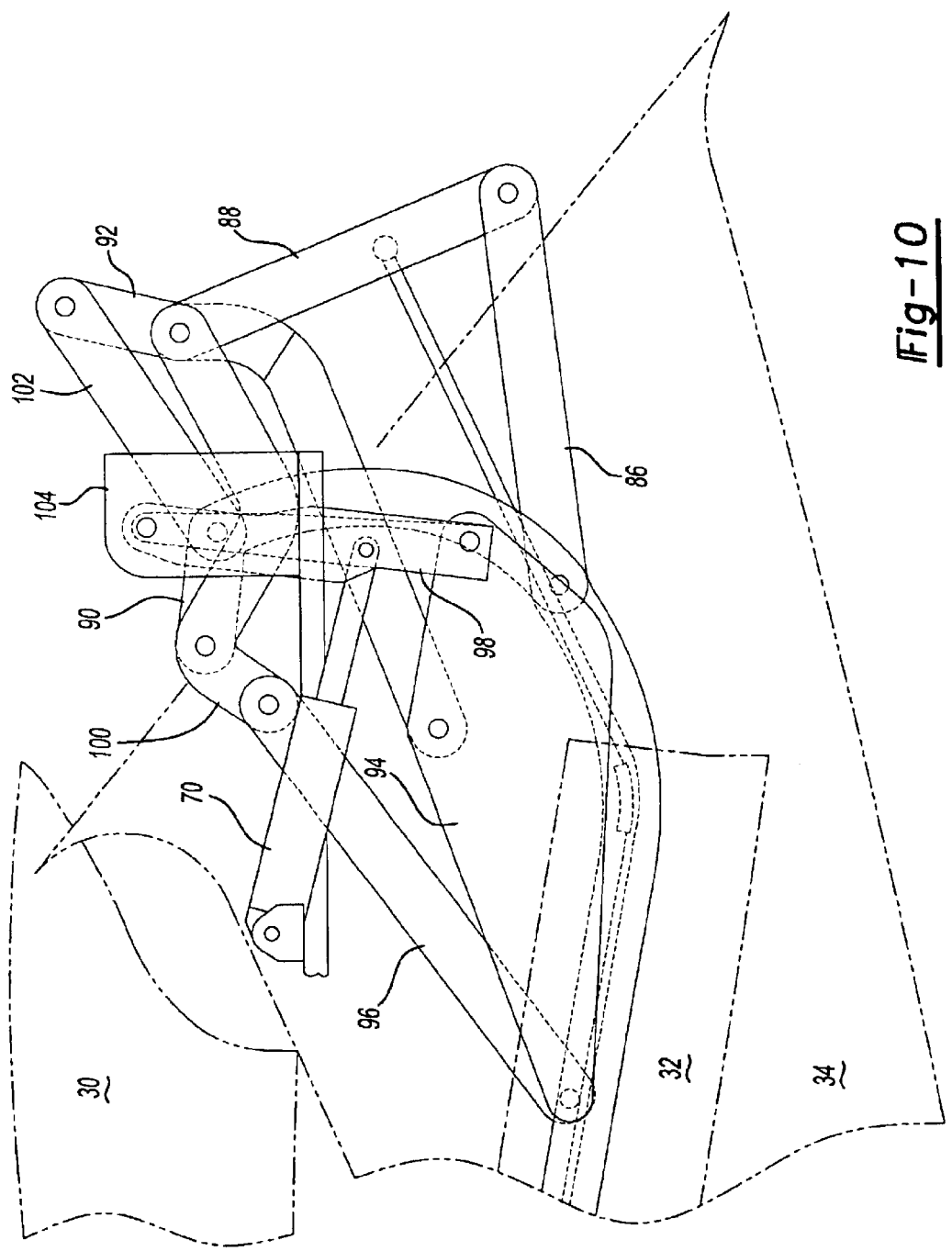
FIG. 10 is an enlarged partial side elevational view depicting the convertible roof of the present invention in the stowed position.

In operation, convertible roof 12 is moved from the raised position depicted in FIGS. 1–5, through intermediate positions such as the one depicted in FIGS. 6–8, to the stowed position depicted in FIGS. 9 and 10 by first unlatching first roof section 30 from header 22. An operator engages a switch (not shown) located in passenger compartment 16. The switch is connected electrically to actuator 70 to control the operation of retraction mechanism 36. When convertible roof 12 is used in conjunction with a manually operated tonneau cover, a simple switch may be implemented without the need for sophisticated electronic controls, proximity switches and/or sensors. However, the convertible roof of the present invention may be operated in conjunction with a power operated tonneau cover as previously discussed. In this case, the switch is connected electrically to an electronic control unit, such as a microprocessor, that controls the operation of retraction mechanism 36. The electronic control unit sends a signal to operate actuator 70 and an actuator coupled to tonneau cover 26. Devices such as limit switches, sensors and potentiometers are coupled to body 14, tonneau cover 26 and convertible roof 12 to inform the electronic control unit of the position of tonneau cover 26 and roof 12 to assure that convertible roof 12 does not interfere with tonneau cover 26 during movement toward the stowed or raised positions.

Regardless of the type of control system implemented, actuator 70 is powered to drive seventh link 98 toward the position depicted in FIGS. 6 and 7. As rear linkage assembly 74 articulates, a tensile force is input from second link 88 to flexible member 76. The tensile force produced is sufficient to overcome the biasing force generated by spring 83. As depicted in FIG. 8, first roof section 30 pivots relative to second roof section 32 in a typical clam shell manner such that inner surface 42 of first roof section 30 approaches inner surface 50 of second roof section 32. Rear linkage assembly 74 also begins to drive second roof section 32 toward a nested position by positioning trailing edge 54 of second roof section 32 toward third roof section 34. Third roof section 34 begins to enter roof storage compartment 24.

With reference to FIGS. 9 and 10, convertible roof 12 is shown in the stowed position. In the stowed position, first roof section 30, second roof section 32 and third roof section 34 are each positioned in a substantially horizontal manner within roof storage compartment 24. Outer surface 40 of first roof section 30 is positioned beneath tonneau cover 26. Outer surface 48 of second roof section 32 is positioned to face inner surface 58 of third roof section 34. Leading edge 44 of first roof section 30 is positioned rearward of trailing edge 62 of third roof section 34 while the trailing edge 46 of first roof section 30 is positioned forward of leading edge 60 of third roof section 34.

To achieve a minimal packaging envelope, trailing edge 54 of second roof section 32 is positioned rearward of trailing edge 62 of third roof section 34. At this time, leading edge 52 of second roof section 32 is positioned proximate leading edge 60 of third roof section 34.

As shown in FIG. 9, convertible roof 12 is completely packaged within roof storage area 24 separate from miscellaneous storage area 18. A deck lid 108 is coupled to body 14 to allow access to miscellaneous storage area 18 without accessing roof storage area 24. Therefore, convertible roof 12 does not obstruct access to miscellaneous storage area 18 while positioned in either the raised or stowed position.

While it is apparent that the embodiments of the invention disclosed are well calculated to provide the advantages and features above stated, it will be appreciated that the invention is susceptible to modification, variation and change without departing from the proper scope or fair meaning of the subsequent claims. For example, the convertible roof may include extra roof sections or additional members to the retraction mechanism. A soft top roof may also be used with the present device. While the device was described to include hydraulic actuators, an electric motor or other suitable power transfer mechanism may alternately be employed to deploy convertible roof 12. Furthermore, the convertible roof can alternately be stored in a miscellaneous storage area such as a trunk of a conventional sedan or coupe rather than in a roof storage compartment as presently disclosed. Other materials and dimensions can be substituted for those disclosed. It is intended by the following claims to cover these and any other departures from the disclosed embodiments which fall within the true spirit of this invention.

What is claimed is:

1. A convertible roof for a vehicle, said convertible roof comprising:
    a first substantially rigid roof section moveable from a raised position to a stowed position;
    a second substantially rigid roof section pivotally coupled to said first roof section;
    at least a third roof section; and
    a retracting mechanism moveably interconnecting said first roof section, said second roof section and said third roof section, wherein said first, second and third roof sections are substantially horizontally positioned when in said stowed position, wherein said retracting mechanism includes a flexible member connected to said first roof section and a linkage assembly coupled to said second roof section.

2. The convertible roof of claim 1 wherein said flexible member rotates said first roof section toward said second roof section in opposition to a biasing toward said raised position during movement of said convertible roof from said raised position to said stowed position.

3. The convertible roof of claim 2 wherein an inner surface of said first roof section faces an inner surface of said second roof section when said roof sections are in said stowed position.

4. A convertible roof for a vehicle, said convertible roof comprising:
    a first substantially rigid roof section moveable from a raised position to a stowed position;
    a second substantially rigid roof section pivotally coupled to said first roof section;
    at least a third roof section; and
    a retracting mechanism moveably interconnecting said first roof section, said second roof section and said third roof section, wherein said first, second and third roof sections are substantially horizontally positioned when in said stowed position, wherein an outer surface of said second roof section faces an inner surface of said third roof section when said roof sections are in said stowed position and wherein an outer surface of said first roof section faces upward when said convertible roof is in said stowed position.

5. The convertible roof of claim 4 wherein an inner surface of said first roof section faces an inner surface of said second roof section when said roof sections are in said stowed position.

6. The convertible roof of claim 4 wherein a leading edge of said first roof section is positioned rearward of a trailing edge of said third roof section when said roof sections are in said stowed position.

7. The convertible roof of claim 4 wherein a trailing edge of said second roof section is positioned rearward of a trailing edge of said third roof section when said roof sections are in said stowed position.

8. The convertible roof of claim 4 wherein said third roof section includes a three-dimensionally curved back window.

9. A convertible roof for a vehicle, said convertible roof comprising:
    a first roof section moveable from a raised position to a stowed position;
    a second roof section pivotally coupled to said first roof section;
    a third roof section moveably coupled to said second roof section; and
    a retracting mechanism operable to move said first, second and third roof sections from said raised position to said stowed position, wherein said retracting mechanism includes a flexible member coupled to said first roof section and wherein said flexible member operably drives said first roof section to rotate relative to said second roof section.

10. The convertible roof of claim 9 wherein an inner surface of said first roof section faces an inner surface of said second roof section when said roof sections are in said stowed position.

11. The convertible roof of claim 10 wherein an outer surface of said second roof section faces an inner surface of said third roof section when said roof sections are in said stowed position.

12. The convertible roof of claim 11 wherein an outer surface of said first roof section faces upward when said convertible roof is in said stowed position.

13. The convertible roof of claim 12 wherein a leading edge of said first roof section is positioned rearward of a trailing edge of said third roof section when said roof sections are in said stowed position.

14. The convertible roof of claim 9 wherein said first roof section is biased toward said raised position.

15. The convertible roof of claim 14 wherein said flexible member operably drives said first roof section to rotate relative to said second roof section in opposition to said biasing.

16. The convertible roof of claim 9 wherein said retracting mechanism includes a hinge pivotally interconnecting said first section and said second section.

17. The convertible roof claim of 16 wherein one end of said flexible member is coupled to said hinge.

18. The convertible roof of claim 17 wherein said retracting mechanism includes a linkage assembly interconnecting said second roof section and said third roof section, wherein an opposite end of said flexible member is coupled to said linkage assembly.

19. A method of operating a convertible roof comprising:
  moving at least first, second and third substantially rigid roof sections from a raised position to a stowed position by rotating said first section relative to said second section about a pivot axis, said pivot axis being spaced apart from an intersection of said first and second sections;
  retracting said first and second sections to stack said first, second and third sections substantially horizontally in said stowed position; and
  positioning an inner surface of said first section facing an inner surface of said second section.

20. The method of claim 19 further including biasing said first section toward said raised position.

21. A method of operating a convertible roof comprising:
  moving at least first, second and third substantially rigid roof sections from a raised position to a stowed position by rotating said first section relative to said second section about a pivot axis, said pivot axis being spaced apart from an intersection of said first and second sections;
  retracting said first and second sections to stack said first, second and third sections substantially horizontally in said stowed position; and
  positioning an outer surface of said second section facing an inner surface of said third section.

22. A method of operating a convertible roof comprising:
  moving at least first, second and third substantially rigid roof sections from a raised position to a stowed position by rotating said first section relative to said second section;
  retracting said first and second sections to stack said first, second and third sections substantially horizontally in said stowed position; and
  tensioning a cable coupled to said first section.

23. The method of claim 22 further including storing said convertible roof in a roof storage compartment separate from a miscellaneous storage area.

24. The method of claim 22 wherein said first section is the forwardmost roof section when in said raised position.

* * * * *

UNITED STATES PATENT AND TRADEMARK OFFICE
CERTIFICATE OF CORRECTION

PATENT NO. : 6,820,917 B2
DATED : November 23, 2004
INVENTOR(S) : Todd Grubbs

It is certified that error appears in the above-identified patent and that said Letters Patent is hereby corrected as shown below:

Title page,
Item [56], References Cited, OTHER PUBLICATIONS,
"Gaylord" reference, "Gladiotor" should be -- Gladiator --.
"Heuliez Hardtop" reference, delete "pg. 14".
"Isuzu" reference, "VS-02" should be -- VX-02 --.
Delete duplicate references "Heuliez Retrctop" through "Mercedes-Benz SLK/1996".
"Peugeot/1998" reference, after "Peugeot" insert -- 20 --.
"Peugeot/7 CC" reference, after "Peugeot" insert -- 3 --.

Column 5,
Line 63, "interconnecting" should be -- coupled to --.

Column 7,
Line 12, "claim of" should be -- of claim --.

Signed and Sealed this

Twenty-fourth Day of May, 2005

JON W. DUDAS
*Director of the United States Patent and Trademark Office*